(No Model.) 2 Sheets—Sheet 1.
E. W. HARDEN.
QUADRUPLEX ENGINE.
No. 507,433. Patented Oct. 24, 1893.
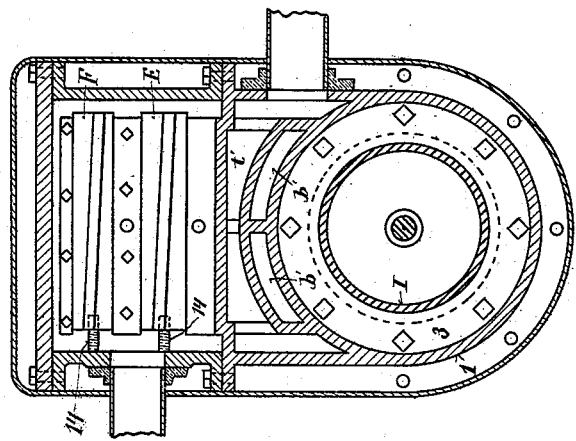
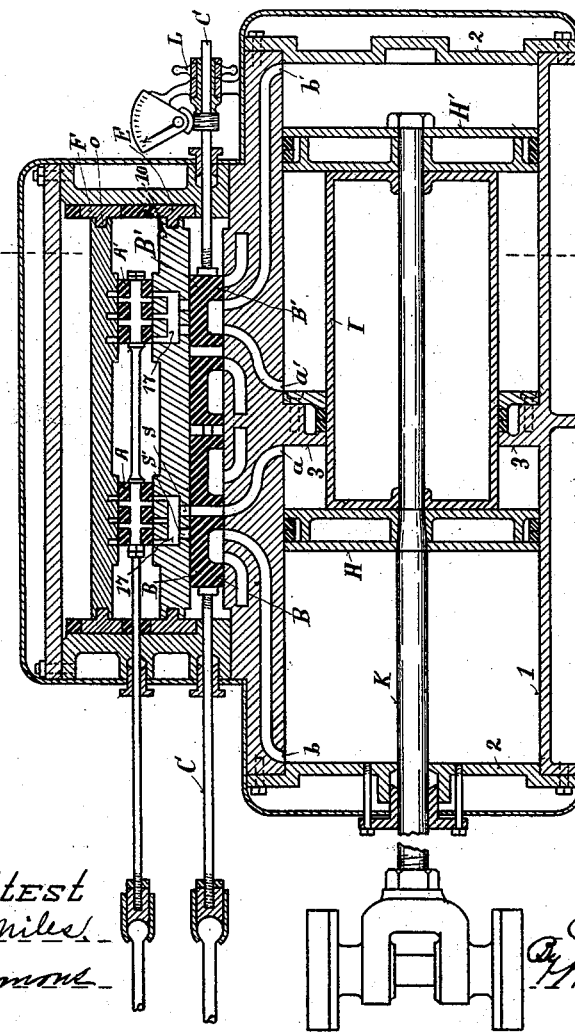
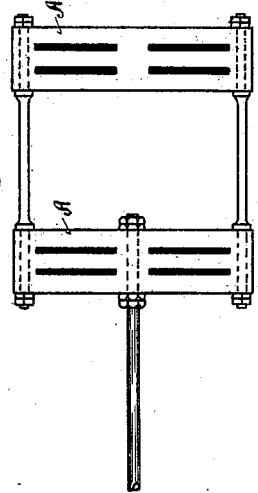
Attest
C. W. Miles
T. Simmons
Inventor
Edward W. Harden
By Wood & Boyd, Attys.

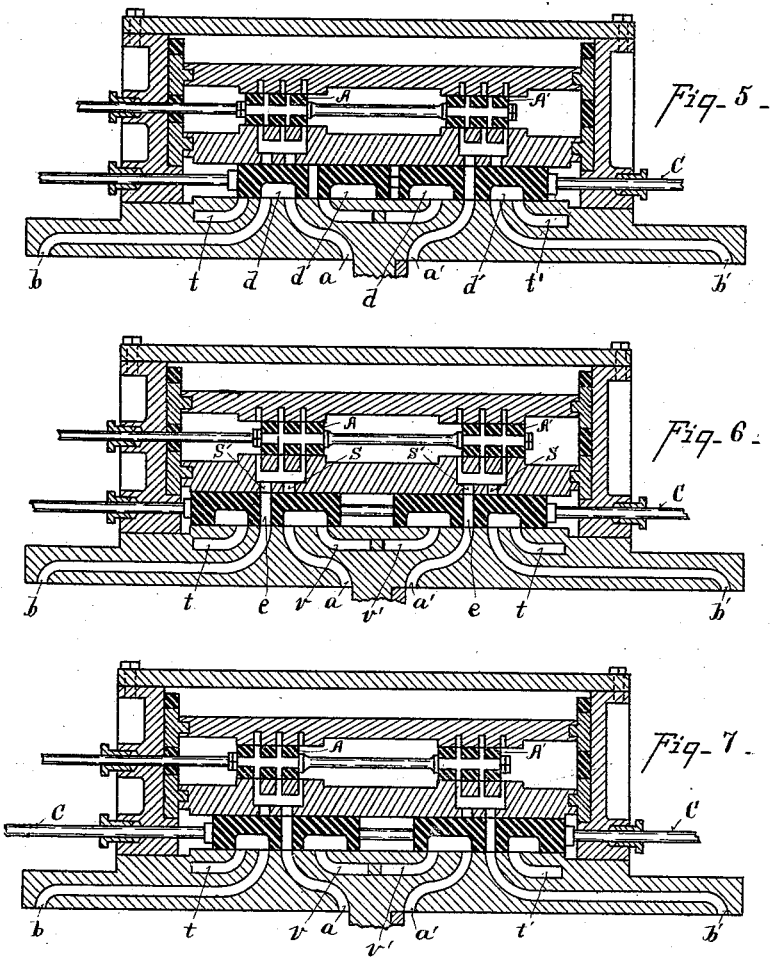

UNITED STATES PATENT OFFICE.

EDWARD W. HARDEN, OF CINCINNATI, OHIO, ASSIGNOR TO FREDERIC C. WEIR, OF SAME PLACE.

QUADRUPLEX ENGINE.

SPECIFICATION forming part of Letters Patent No. 507,433, dated October 24, 1893.

Application filed February 10, 1892. Serial No. 421,034. (No model.)

*To all whom it may concern:*

Be it known that I, EDWARD W. HARDEN, a citizen of the United States, residing at Cincinnati, in the county of Hamilton and State of Ohio, have invented certain new and useful Improvements in Quadruplex Engines, of which the following is a specification.

My invention relates to a quadruplex engine which employs two pistons upon one piston rod, the two faces of which are adapted to act under high pressure, and two faces of which are adapted to act under low pressure, or the four faces may be used to act under high pressure; thus forming a duplex compound engine or a quadruplex single acting engine.

The various features of my invention are fully set forth in the description of the accompanying drawings making a part of this specification, in which—

Figure 1 is a central longitudinal section of my improvement. Fig. 2 is a sectional elevation on line $x, x$, Fig. 1. Fig. 3 is a plan view of the auxiliary valves. Fig. 4 is a plan view of the main valves. Fig. 5 is a central longitudinal section of the valves, steam chest, and cylinder ports showing the valve in opposite position from that shown in Fig. 1. Figs. 6 and 7 are similar views showing the different extreme positions of the valves when the four pistons are acting direct when working as a quadruplex.

1 represents the cylinder, 2 the heads thereof; 3 an annular journal bearing which serves as a partition to divide the central portion of the cylinder into two compartments.

H H' represent the piston heads.

I represents a cylinder interposed between and connecting the heads H H' together. K represents the piston rod on which the said pistons and the cylindrical connection I are securely attached. The construction and operation of the auxiliary valves A A' and the main valves B B' are the same as those parts shown in my application of even date herewith, Serial No. 421,055 except the ports are duplex, the valves B B' are mounted upon one valve rod C in engagement with right and left hand screw threads thereon and they are adjustable forward and backward upon said rod by means of the hand wheel L. But the two valves move differently from the single valve. The valve rod herein shown passes through the main valves B B' and is provided with right and left hand screw threads to engage with the right and left hand nuts $l\,l'$, so that the valves are moved apart or drawn together as the engine is changed from a direct into a compound engine and vice-versa. They are constructed and arranged as follows: $a'$ represents the live steam port supplying steam to the smaller area of piston H'; $b'$ represents the supply and exhaust port leading to the larger area of said piston. $a$ represents the live steam port for the small area of piston H, and $b$ the steam supply for the opposite or larger area. The two main valves B are each provided with a live steam port $e$, and each provided with the ports $d, d'$, in front and in rear of the live steam port $e$. $t, t'$, represent the exhaust ports in the cylinder leading to the common exhaust chamber on the side thereof. The ports $b\,b'$ likewise represent exhaust ports communicating with the ports $t, t$, of the main valve for exhausting when the engine is used with the steam direct.

When the valves are in position shown in Fig. 1, the engine is working as compound, and the piston H is receiving live steam through the port $a$, and the piston H' is receiving low pressure steam from port $b$, through the ports $a'\,b'$, and the ports $b, t, d,$ are exhausting low pressure; and the main valve B in this case is in its most forward position.

In Fig. 5 the valve is shown in its rear position when working as a compound, and in this instance the live steam is being directed upon the face of the pistons H', and the low pressure steam compounded upon the face of H, being the opposite in its operation to that shown in Fig. 1.

When it is desired to convert the engine from a compound to a direct acting engine the main valves B are moved apart by the turning of the rod C by means of the hand wheel L, and brought into the position shown in Fig. 6, which shows the ports $b$ receiving direct steam for the larger face of piston H, and the ports $a'$ likewise receiving high pressure or direct steam on the small area of piston H'; and the ports $b'$ are exhausting through the ports $d'$ of the valve into the ports $t'$ and $v$.

Fig. 7 shows the valves in the position for receiving steam and exhausting upon the opposite face of the pistons from that shown in Fig. 6. By the construction herein shown I am able to use a duplex compound piston and instantly convert said duplex compound into a quadruplex piston of double or more than double the power when used as a compound; this change can be readily made without stopping the engine, and it is highly advantageous for locomotive and other engines which require a high power at times and less power and more economical at other times.

The use of the auxiliary valve in connection with the adjustable compound valves is highly advantageous as it prevents wire drawing of the steam in the steam chest, and various cut-offs which may be accomplished by various devices so that any desired cut-off may be obtained by the movement of the auxiliary valve, while the movement of the main valve is constant, and yet it may be shifted readily to convert the engine from a direct to a compound form.

The central valve seat 10 is provided with two ports S S', the former being used when the engine is working compound, but when said valves are adjusted on their seat to work as a direct acting engine both ports S and S' are used to alternately supply steam to either piston. The ports S S' communicate with the central port 17, and port 17 has three ports communicating with the ports of the auxiliary valve; this is the preferred form of construction. The auxiliary valve having two ports and admitting steam at the end of the valve into the third port of the seat being the equivalent of the three port auxiliary valve. If only two ports are used in the auxiliary valve only two ports will be required in the seats. The upper seat likewise has three ports corresponding to the three ports in the lower seat so that steam may be admitted over the top of the valve as well as through the shell portion of the valve, thereby balancing the valve against the pressure of the steam.

Fig. 2 of the drawings shows the valves removed from the steam chest so as to show the construction of the valve seats; the valve seats 10, 11, are each made adjustable vertically to or from the valve; this is preferably accomplished by making the inclined groove $o$ in the end of the valve seat fitting inclined tenons $p$ on the slides E, F. 14 represents adjusting screws tapping through the sides of the steam chest into these slides; as these screws are turned the guides are adjusted longitudinally to raise or lower the valve seats as occasion requires. It will thus be seen that in a single engine I am enabled to employ four piston faces mounted upon a common piston rod, the two smaller of which faces are acted upon by high pressure steam, and the two larger faces from the low pressure steam automatically exhausting from the high pressure over on to the low pressure face. And by means of the duplex valve arrangement this may be converted into a quadruplex single acting engine by admitting the direct steam simultaneously on to the larger face of one piston, and the smaller face of the opposite piston.

In order to prevent leakage from one piston chamber to the other I provide a packing ring H in the central partition 3 of the cylinder within which the piston cylinder I bears.

When it is desired to use the herein described engine only as a compound engine the ports $v$ and $v'$ may be omitted as these are only required when the engine is being worked as a direct engine.

Various advantages are attained by the quadruplex form of cylinder and piston here shown. First. I obtain an equal pressure on both ends or on both piston faces whether working as a simple or compound and am thus enabled to start under load from any position of piston, a result which cannot be obtained with the duplex form shown in Letters Patent No. 490,348, granted me January 24, 1893, without the use of auxiliary devices. Second. I avoid the use of a long bearing of the trunk piston in the trunk cylinder. Third. By avoiding the use of the trunk cylinder by using the quadruplex form of piston, the bearing surface of the piston is distributed on the two piston heads and the central bearing partition; hence a greater amount of power is obtained with a minimum amount of friction space and weight of metal.

Having described my invention, what I claim is—

1. In a quadruplex engine, the combination with a steam cylinder having an annular bearing or partition, and provided with steam supply and exhaust ports, of a piston rod carrying piston heads, a cylinder disposed between and of a smaller diameter than said piston heads, a reciprocating and revoluble valve stem, duplex main valves carried by and adjustable in opposite directions upon said valve stem and having ports communicating with the ports in the steam cylinder, auxiliary valves located above said main valves and provided with ports, and a valve seat interposed between said main and auxiliary valves, and having ports communicating with the ports in said valves, substantially as described.

2. In a quadruplex engine, the combination with a steam cylinder having an annular bearing or partition and provided with steam supply and exhaust ports, of a piston rod carrying piston heads, a cylinder disposed between and of a smaller diameter than said piston heads, a revoluble and reciprocating valve stem provided with right and left hand screw threads, and duplex valves by and adjustable in opposite directions upon said valve stem, said valves having ports communicating with the ports in the steam cylinder, substantially as described.

3. In a quadruplex engine, the combination with a steam cylinder having an annular bearing or partition, of a piston rod carrying piston heads, a cylinder disposed between and of a diameter smaller than said piston heads, of a revoluble and reciprocating valve stem, and duplex valves carried by and simultaneously adjustable in opposite directions upon said valve stem, said valves having ports communicating with the ports in the steam cylinder, substantially as described.

4. In a quadruplex engine, the combination with a steam cylinder having an annular bearing or partition and provided with steam supply ports $a, a'$ and $b, b'$, and exhaust ports $t, t'$, and $v, v'$, of a revoluble and reciprocating valve stem, and duplex valves carried by and simultaneously adjustable in opposite directions upon said valve stem, said valves having ports communicating with the ports in the steam cylinder, substantially as described.

5. In a quadruplex engine, the combination with a steam cylinder having an annular bearing or partition, of a piston rod carrying piston heads and provided with steam supply and exhaust ports, of a revoluble and reciprocating valve stem, duplex valves carried by and adjustable in opposite directions upon said valve stem, and having ports communicating with the ports in the steam cylinder, a valve seat located above said valves and provided with ports communicating with the ports in said valves, substantially as described.

6. In a steam engine, the combination with a steam cylinder having ports, a duplex differential piston in said cylinder, and one or more reciprocating valves having ports communicating with the ports of the cylinder, of a valve seat located above said valves and mounted on the adjustable slides E, and mechanism for moving said slides longitudinally to adjust the valve seats, substantially as described.

7. In a steam engine, the combination with a steam cylinder having ports and a duplex differential piston in said cylinder of a reciprocating duplex valve having ports communicating with the ports of the cylinder, the auxiliary valves A A', and an adjustably supported valve seat located between said duplex valve and the auxiliary valves, substantially as described.

8. In a steam engine the combination with a steam cylinder having ports, a duplex differential piston in said cylinder, and a reciprocating duplex valve having ports communicating with the ports of the cylinder, valve seats mounted on slides E and inclined guides formed on the slides and seats respectively, and mechanism for moving said slides longitudinally to adjust said valve seats, substantially as described.

9. In a steam engine, the combination with a steam cylinder having ports, a duplex differential piston in said cylinder, and a duplex reciprocating valve having ports communicating with the ports of the cylinder, auxiliary valves A, A', having ports and a valve seat located between the duplex valve and the auxiliary valves and having ports communicating with the ports in said valves, substantially as described.

10. In a quadruplex engine, the combination with a steam cylinder having a central annular bearing and a live steam port, a compounding port and an exhaust port on each side of said annular bearing, and a piston composed of the heads H H' connected by the cylinder I with suitable valve mechanism, whereby live steam is admitted on to the smaller area of piston head and compounded on the larger area of said head on the next stroke, substantially as specified.

11. In combination with a piston composed of the heads H H', a cylinder I connecting thereto the steam cylinder provided with a central partition bearing, live steam ports upon each side of said partition, compounding ports extending to the outer ends of said cylinder and communicating with the larger area exhaust ports $t\ t'$, and valve mechanism consisting of the main and auxiliary valves, substantially as specified.

In testimony whereof I have hereunto set my hand.

EDWARD W. HARDEN.

Witnesses:
   T. SIMMONS,
   C. W. MILES.